No. 874,195. PATENTED DEC. 17, 1907.
G. HERBERT, Jr.
MECHANISM FOR DETACHING BISCUITS FROM THEIR PANS.
APPLICATION FILED MAY 6, 1907.
2 SHEETS—SHEET 2.
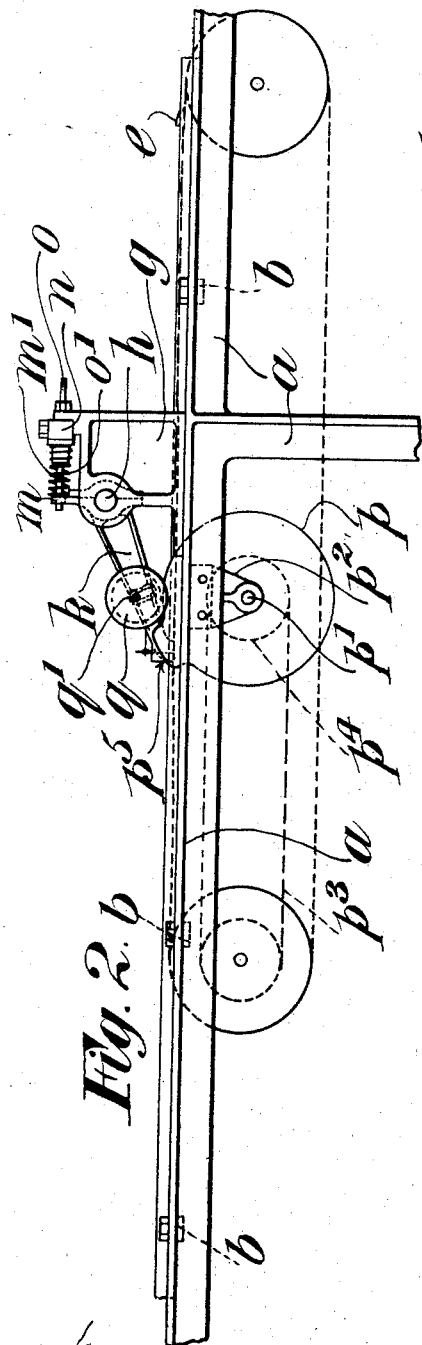
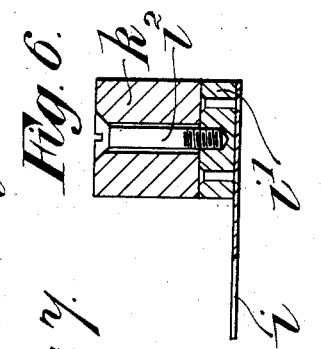
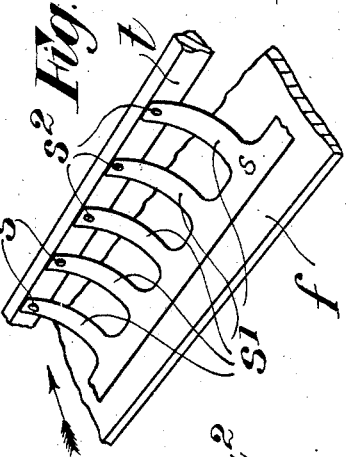
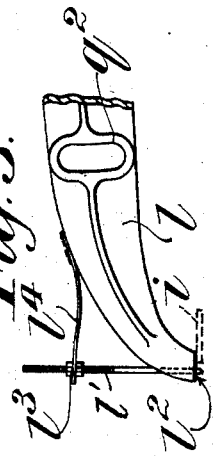
Witnesses:
P. F. Nagle.
C. L. McVay
Inventor
George Herbert, Jr.
By Diedersheim & Fairbanks,
Attorneys.

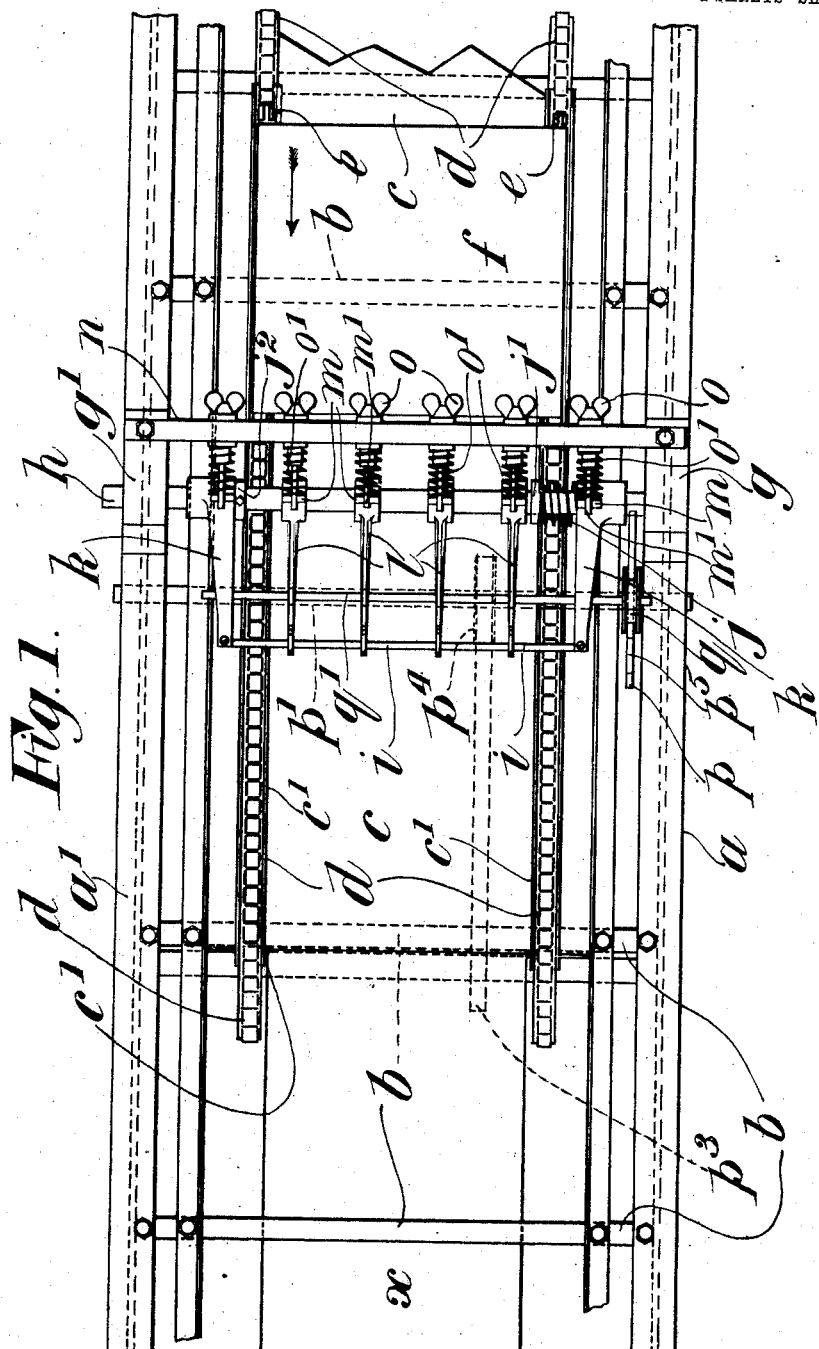

UNITED STATES PATENT OFFICE.

GEORGE HERBERT, JR., OF GLASGOW, SCOTLAND.

MECHANISM FOR DETACHING BISCUITS FROM THEIR PANS.

No. 874,195.　　　　Specification of Letters Patent.　　Patented Dec. 17, 1907.

Application filed May 6, 1907. Serial No. 372,024.

*To all whom it may concern:*

Be it known that I, GEORGE HERBERT, Jr., a subject of the King of Great Britain, residing at 719 Shields road, Pollokshields, Glasgow, Scotland, have invented Mechanism for Detaching Biscuits from their Pans, of which the following is a specification.

At present in the manufacture of sponge and other dropped biscuits, it is difficult to detach them after being baked from their pans as they adhere strongly to the surface of the same, so much so that they cannot readily be shaken off.

The object of my invention is to provide mechanism whereby biscuits can be detached from the pans both easily and expeditiously.

The mechanism essentially consists of a wire or a metal strip or blade (or wires, or metal strips, or blades) held by arms in such manner that it will contact with and adjust itself to the surface of the pan. The wire or blade is caused to pass under the biscuits and detach them from the pan, and this may be done either by causing the wire or blade to travel along the surface of the pan or by moving the pan below a fixed wire or blade.

In order that the said invention may be clearly understood I have hereunto appended explanatory drawings which show, by way of illustration or example, one method of carrying out my invention by means of a moving pan and a fixed wire or blade.

On the said drawings:—Figure 1 is a plan view of the mechanism. Fig. 2 is a side view of the same. Fig. 3 is a side view of one of the arms $l$. Fig. 4 is a view of a slightly modified form of the same. Fig. 5 is a perspective view showing one end of the blade $i$ and block $i^1$. Fig. 6 is a sectional view showing the method of attaching the blade to the arms $k$. Fig. 7 shows, in perspective, a modified arrangement.

In carrying out my invention I preferably carry the mechanism between two side cheeks or frames $a$, $a^1$, connected by means of cross bars $b$ which support a table $c$ having longitudinal grooves or recesses $c^1$ therein. Working within the grooves $c^1$ is a pair of endless traveling chains $d$ driven by means of sprockets, suitably mounted in the machine and the chains are each fitted with a number of upstanding studs or projections $e$ so arranged that when the pan $f$ carrying the biscuits is placed on the table $c$ at the right hand end Figs. 1 and 2 thereof, the projections $e$ come into engagement with the edge of the pan and move it, with the biscuits thereon, from end to end of the table and in the direction of the arrow.

Fitted in brackets $g$, $g^1$, which are carried on and extend upwards from side cheeks or frames is a cross shaft $h$ carrying, on the ends of its projecting arms $k$, the blade $i$ by means of which the biscuits are detached from the pan $f$. This blade $i$ which is preferably a flat strip of flexible steel as shown at Figs. 5 and 6, has a small block or piece $i^1$ riveted to each end thereof and the blade is secured to the ends of the arms $k$ by means of the screws $i^2$ which pass through the ends of the arms and enter the blocks $i^1$. The arms $k$ are forced apart, so as to tighten the blade $i$ by means of a spiral spring $j$ which is held in compression between the boss of one of the arms $k$ and a collar $j^1$ secured on the shaft $h$ a second collar $j^2$ preventing any inward movement of the other arm $k$.

The flexible blade is caused to adjust itself to the surface of the pan by means of a number of arms $l$ carried on the shaft $h$ and provided at their outer ends with adjustable screws or stops $l^1$ which bear on the pan and against the back edge of the blade and prevent the latter being forced back by the biscuits while the ends $l^2$ of the arms bear upon the upper side of the blade (see Fig. 3) and cause it to adapt itself to the inequalities of the pan. The adjustable screws or stops $l^1$ pass through holes bored in the ends of the arms and are screwed at their upper ends and passed through nuts $l^3$ secured on the end of flat springs $l^4$ pinned to the arms, with the result that the screws $l^1$ are pressed downwards by the springs $l^4$ and may be adjusted by means of the nuts. The arms $l$ as well as the arms $k$ are all pressed downwards individually by means of springs so as to hold the blade against the pan. The bosses or collars of each of the arms is made with an upwardly extending projection $m$ having a slot therein through which passes a pin $m^1$ projecting from a longitudinally slotted cross bar $n$ carried between the brackets $g$, $g^1$. Each pin $m^1$ is fitted in the slot of the bar $n$ and is provided with a spiral spring $o^1$ and an adjusting thumb screw $o$, the spring being in compression between the projection $m$ on the boss of the arm and a collar or shoulder on the pin $m^1$. By slackening the thumb screws $o$, the pins $m^1$, and also the arms $l$, in conjunction therewith may be moved laterally to suit the spacing of the biscuits on the pan. When the pan has passed below the blade $i$ it is necessary to slightly raise the latter so as to prevent it engaging with the studs or projections $e$ on the traveling chains $d$. To accomplish this, the blade is lifted by means of a cam $p$ keyed on a shaft $p^1$ carried in brackets $p^2$ fitted to the side cheeks or frames and depending beneath the surface of the table, and driven through chain gear $p^3$ by means of a sprocket $p^4$. The cam $p$ engages with a grooved wheel $q$ carried on the end of a shaft $q^1$ which extends from side to side of the machine, passing through a slot $q^2$ in each of the arms $k$, $l$. The chains $d$ and the cam $p$ are so driven and arranged that at the proper time to lift the blade over the projections $e$ the nose $p^5$ on the cam comes in contact with the grooved wheel $q$ which is thereby raised and raises with it, by means of its shaft $q^1$, the arms $k$ and $l$. The blade is thereby raised and then allowed to fall again, on the studs or projections $e$ having passed beneath it.

The pans with the biscuits thereon are placed one after the other on the table $c$ and behind the detaching device. Each pan is moved forward in the direction of the arrow, Fig. 1 by means of the traveling chains $d$ with the studs or projections $e$ thereon. As each pan passes under the spring pressed blade $i$ the latter passes beneath the biscuits and detaches them from the pan and leaves them lying on it. The biscuits are then gently slid off and on to an endless band conveyer $x$. The chains $d$, chain $p^3$, and the band conveyer can be driven by power in any suitable and well known manner.

Instead of pressing the arms $k$ and $l$ downwards by means of springs, as shown in Figs. 1 and 2, a weight $r$ may as shown at Fig. 4, be carried on each arm $l$ and a similar weight on each arm $k$.

Fig. 7 shows a modification wherein, in lieu of the arms $l$ and $k$ and blade $i$ a flexible steel strip $s$ is used, having projecting arms $s^1$. The strip is secured through its arms by means of bolts or studs $s^2$ to a cross bar $t$ secured at its ends in brackets somewhat similar to the brackets $g$, $g^1$, and mounted on the side frames so that the said strip bears upon, and detaches the biscuits from the pan as it passes along in the direction indicated by the arrow.

Having now fully described my invention what I claim and desire to secure by Letters Patent is:—

1. In the manufacture of biscuits a device for mechanically detaching the baked biscuits from their pans means for moving the pans, and means for raising said device out of the path of the pan-moving means.

2. In the manufacture of biscuits a device for mechanically and automatically detaching the baked biscuits from their pans means for moving the pans, and means for raising the said device out of the path of the pan-moving means.

3. In the manufacture of biscuits, a device comprising, in combination, means for mechanically and automatically detaching the baked biscuits from their pans means for moving the pans and means for raising said device out of the path of the pan-moving means.

4. In the manufacture of biscuits, the combination with a metal strip for detaching the baked biscuits from their pans of means for holding the strip in position means for moving the pans and means for raising said device out of the path of the pan-moving means.

5. In the manufacture of biscuits the combination with a metal strip for detaching the baked biscuits from their pans, of arms between which the metal strip is stretched means for moving the pans and means for raising said device out of the path of the pan-moving means.

6. In the manufacture of biscuits a device for detaching the baked biscuits from their pans, comprising, in combination, a metal strip, arms between which the metal strip is stretched, a support for the arms, springs acting on the arms, means for moving the pans and means for raising the said device out of the path of the pan-moving means.

7. In the manufacture of biscuits a device for detaching the baked biscuits from their pans, comprising, in combination, a metal strip, arms between which the metal strip is stretched, a support for the arms, springs acting on and depressing the arms, means for moving the pans and means for raising said device out of the path of the pan-moving means.

8. In the manufacture of biscuits a device for detaching the baked biscuits from their pans, comprising, in combination, a metal strip, arms between which the metal strip is stretched and held, springs acting on each of the said arms, and mechanism for automatically moving the pans below the said metal strip and a cam for raising said strip out of the path of the pan-moving means.

9. In the manufacture of biscuits a device for detaching the baked biscuits from their pans comprising, in combination, a metal strip, arms holding the metal strip, springs acting on the said arms so as to depress the same, means for moving a pan below the said metal strip and means for automatically raising the metal strip above the pan.

10. In the manufacture of biscuits a device for detaching the baked biscuits from their pans, comprising, in combination, a metal strip, arms holding the metal strip, springs acting on the said arms so as to depress the same, means for moving a pan below the said metal strip and means for automatically raising at intervals the metal strip above the pan.

11. In the manufacture of biscuits a device for detaching the baked biscuits from their pans comprising, in combination, a metal strip, arms holding the metal strip, springs acting on the said arms so as to depress the same, means for moving a pan below the said metal strip and cam mechanism for automatically raising the metal strip above the pan.

12. In the manufacture of biscuits, a device for detaching the baked biscuits from their pans, comprising, in combination, a metal strip, arms holding the metal strip, springs acting on the said arms so as to depress the same, means for moving a pan below the said metal strip, a wheel on one arm, a cam acting on the wheel to raise said blade above the pan-moving means and means for operating the cam.

13. In the manufacture of biscuits a device for detaching the baked biscuits from their pans comprising, in combination, a flexible metal strip, arms holding the metal strip, springs acting on the said arms so as to depress the same, means for moving a pan below the said metal strip and means for automatically raising the metal strip above the pan.

14. In the manufacture of biscuits a device for detaching the baked biscuits from their pans comprising, in combination, a flexible metal strip, arms holding the metal strip, stops on the arms, springs acting on the said arms so as to depress the same, means for moving a pan below the said metal strip and means for automatically raising the metal strip above the pan.

15. In the manufacture of biscuits a device for detaching the baked biscuits from their pans comprising, in combination, a flexible metal strip, arms holding the metal strip adjustable spring stops on the arms, springs acting on the said arms so as to depress the same, means for moving a pan below the said metal strip and means for automatically raising the metal strip above the pan.

16. In the manufacture of biscuits, the combination with a metal strip for detaching the baked biscuits from their pans, of adjustable arms between which the metal strip is stretched, and means for moving the pans and means for raising said metal strip above the path of the pan-moving means.

17. In the manufacture of biscuits a device for detaching the baked biscuits from their pans, comprising, in combination, a metal strip, arms between which the metal strip is stretched, a shaft carrying the arms, means for adjusting the arms on the shaft, means for depressing the arms and means for moving the pans below the arms.

18. In the manufacture of biscuits a device for detaching the baked biscuits from their pans, comprising, in combination, a metal strip, arms between which the metal strip is stretched, a shaft carrying the arms, brackets carrying the shaft, a slotted bar on the brackets, means for adjusting the arms in said slotted bar, means for holding the arms in the adjusted position, means for depressing the arms and means for moving the pans.

19. In the manufacture of biscuits a device for detaching the baked biscuits from their pans comprising, in combination, mechanical means for detaching the biscuits from their pans, means for moving the pans below said detaching means, a traveling band conveyer for carrying away the biscuits after they are detached from their pans, and means for operating the traveling band conveyer.

20. In the manufacture of biscuits a device for detaching the baked biscuits from their pans, consisting of a frame, brackets thereon, a cross shaft, arms on the shaft, a flexible strip held by the arms, guides on the frame for the reception of the pans, endless chains for moving the pans and means for operating the chains.

21. In the manufacture of biscuits a device for detaching the baked biscuits from their pans, consisting of a frame, brackets thereon, a cross shaft, a slotted bar at the back of the shaft, arms movably mounted on the shaft, slotted projections on the arms, pins passed through the said slotted projections and the said slotted bar, springs, means for holding the pins in position, a flexible strip held by the arms, guides on the frame for the reception of the pans, endless chains for moving the pans and means for operating the chains.

In testimony whereof I affix my signature in presence of two witnesses.

GEORGE HERBERT, Jr.

Witnesses:
ANDREW HAMILTON,
MARGARET FINDLAY YOUNG.